United States Patent
Jones et al.

(10) Patent No.: US 11,703,743 B2
(45) Date of Patent: Jul. 18, 2023

(54) CAMERA ASSEMBLY WITH COOLED INTERNAL ILLUMINATOR

(71) Applicant: Robert Bosch GmbH, Stuttgart (DE)

(72) Inventors: Theodore L. Jones, Lancaster, PA (US); Devin F. Moore, Lancaster, PA (US); Luke D. Grim, Harrisburg, PA (US)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 17/384,495

(22) Filed: Jul. 23, 2021

(65) Prior Publication Data

US 2023/0023735 A1 Jan. 26, 2023

(51) Int. Cl.
*G03B 17/55* (2021.01)
*G03B 15/03* (2021.01)
*G03B 17/56* (2021.01)

(52) U.S. Cl.
CPC .............. *G03B 15/03* (2013.01); *G03B 17/55* (2013.01); *G03B 17/561* (2013.01)

(58) Field of Classification Search
CPC ........ G08B 13/19617; G08B 13/19619; G08B 13/1963; G08B 13/19632; G08B 13/19639; H04N 5/2251; H04N 5/2252; H04N 5/2257; H04N 5/22521; H04N 5/247; G03B 15/03; G03B 15/04; G03B 15/0405; G03B 15/0442; G03B 15/0484; G03B 15/05; G03B 17/55; G03B 17/561
See application file for complete search history.

(56) References Cited

U.S. PATENT DOCUMENTS

| | | |
|---|---|---|
| 6,061,087 A | 5/2000 | Schieltz et al. |
| 6,902,299 B2 | 6/2005 | Zhan et al. |
| 7,282,841 B2 | 10/2007 | Li |
| 7,497,632 B2 | 3/2009 | Kajino et al. |
| 7,699,691 B1 | 4/2010 | Voigt et al. |
| 8,511,915 B2 | 8/2013 | Lee |
| 8,692,669 B2 | 4/2014 | Mayer et al. |

(Continued)

FOREIGN PATENT DOCUMENTS

| | | | |
|---|---|---|---|
| EP | 3244602 A1 * | 11/2017 | ........... G03B 11/045 |
| WO | 2003098915 A2 | 11/2003 | |

OTHER PUBLICATIONS

AXIS Communications, "AXIS Q6125-LE PTZ Network Camera", Datasheet, 2018, 3 pages.

(Continued)

*Primary Examiner* — Clayton E. LaBalle
*Assistant Examiner* — Fang-Chi Chang
(74) *Attorney, Agent, or Firm* — Michael Best & Friedrich LLP

(57) ABSTRACT

A surveillance camera assembly includes an upper portion providing a mounting feature for the surveillance camera assembly. A ball-shaped head portion of the camera assembly is coupled to the upper portion. A camera lens module is positioned within the head portion and movable relative to the upper portion to pan about a pan axis and tilt about a tilt axis. An illuminator module is movable to pan and tilt with the camera lens module, the illuminator module including laterally opposed arrays of lighting elements supported on distal ends of a bifurcated cooling duct having a central inlet opening coupled to the discharge outlet of a first blower.

20 Claims, 11 Drawing Sheets

(56) References Cited

U.S. PATENT DOCUMENTS

| | | |
|---|---|---|
| 8,964,042 B2 | 2/2015 | Nozawa et al. |
| 9,075,288 B2 | 6/2015 | McBride et al. |
| 9,383,071 B2 | 7/2016 | Kim |
| 9,588,402 B2 | 3/2017 | Baxter et al. |
| 10,212,318 B2 | 2/2019 | Kimura |
| 10,842,042 B2 | 11/2020 | Kim et al. |
| 2007/0126872 A1* | 6/2007 | Bolotine .............. H04N 5/2251 348/E7.086 |
| 2007/0183772 A1 | 8/2007 | Bladwin et al. |
| 2009/0207249 A1 | 8/2009 | Erel et al. |
| 2010/0177519 A1 | 7/2010 | Schlitz |
| 2012/0213503 A1 | 8/2012 | Gustaffson et al. |
| 2014/0301040 A1 | 10/2014 | Hsiao |
| 2020/0332947 A1 | 10/2020 | Raghupathy et al. |

OTHER PUBLICATIONS

AXIS Communications, "AXIS Q6135-LE PTZ Network Camera", Datasheet, 2019, 3 pages.

AXIS Communications, "AXIS Q6125-LE PTZ Network Camera", On sale on or before Jan. 2021, (1 page of photos, including statement of relevance).

* cited by examiner

CAMERA ASSEMBLY WITH COOLED INTERNAL ILLUMINATOR

BACKGROUND

Camera assemblies such as those used for site surveillance can include a camera positioned inside a dome. Within the dome, the camera may be movable about multiple axes for pan and tilt functions to change the field of view, and the camera may also have a zoom function. An illuminator unit can be provided alongside the camera with one or more lighting elements operable to illuminate the field of view for improved image capture. The camera assembly is often mounted outdoors and subjected to changing environmental conditions, including high and low temperature and humidity extremes. Internal components of the camera assembly may also generate heat during use. When the illuminator unit is mounted on an exterior, a running heat from the lighting elements can easily transfer to the surrounding environment, although the direction of the camera's aim becomes highly conspicuous to those under surveillance. When the illuminator unit is mounted with the camera inside the dome, it is less conspicuous, but the heating becomes intensified as the outer portions of the camera assembly are commonly manufactured from plastics, which exhibit poor thermal conductivity.

SUMMARY

The invention provides, in one aspect, a surveillance camera assembly including an upper portion providing a mounting feature for the surveillance camera assembly. A ball-shaped head portion of the camera assembly is coupled to the upper portion. A camera lens module is positioned within the head portion and movable relative to the upper portion to pan about a pan axis and tilt about a tilt axis. An illuminator module is movable to pan and tilt with the camera lens module. The illuminator module includes laterally opposed arrays of lighting elements supported on distal ends of a bifurcated cooling duct having a central inlet opening coupled to the discharge outlet of a first blower.

The invention provides, in another aspect, a surveillance camera assembly including an upper portion providing a mounting feature for the surveillance camera assembly, and a ball-shaped head portion coupled to the upper portion. A camera lens module is positioned within the head portion and movable relative to the upper portion to pan about a pan axis and tilt about a tilt axis. An illuminator module is movable to pan and tilt with the camera lens module, the illuminator module including laterally opposed first and second arrays of lighting elements arranged on front sides of respective first and second circuit boards. The first and second heat sinks are provided on rear sides of the respective first and second circuit boards. A closed-loop airflow circuit includes a first blower configured to pick up air from a central zone of the head portion in front of the camera lens module and direct air through enclosed passages over the first and second heat sinks. Respective outlets of the enclosed passages are located in respective first and second lateral zones of the head portion to the sides of the camera lens module. Both the first and second lateral zones are in fluid communication with an inlet of a second blower positioned at least partly in the upper portion.

The invention provides, in yet another aspect, a method of operating a surveillance camera assembly for thermal management. An upper portion is provided for mounting and a separate head portion is provided including a dome containing a camera lens module and an illuminator module including respective arrays of lighting elements provided alongside the camera lens module. The interior of the surveillance camera assembly is sealed from the ambient environment. A closed-loop airflow circuit takes air from a central zone in front of the camera lens module into a first blower to be subsequently directed through enclosed passages for directed cooling of the respective arrays of lighting elements, and subsequently the airflow heated by the respective arrays of lighting elements is directed into an inlet of a second blower located at least partly in the upper portion, the second blower discharging air back to the central zone in front of the camera lens module. Heat from the respective arrays of lighting elements is transferred by the closed-loop airflow circuit to a metal housing of the upper portion.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
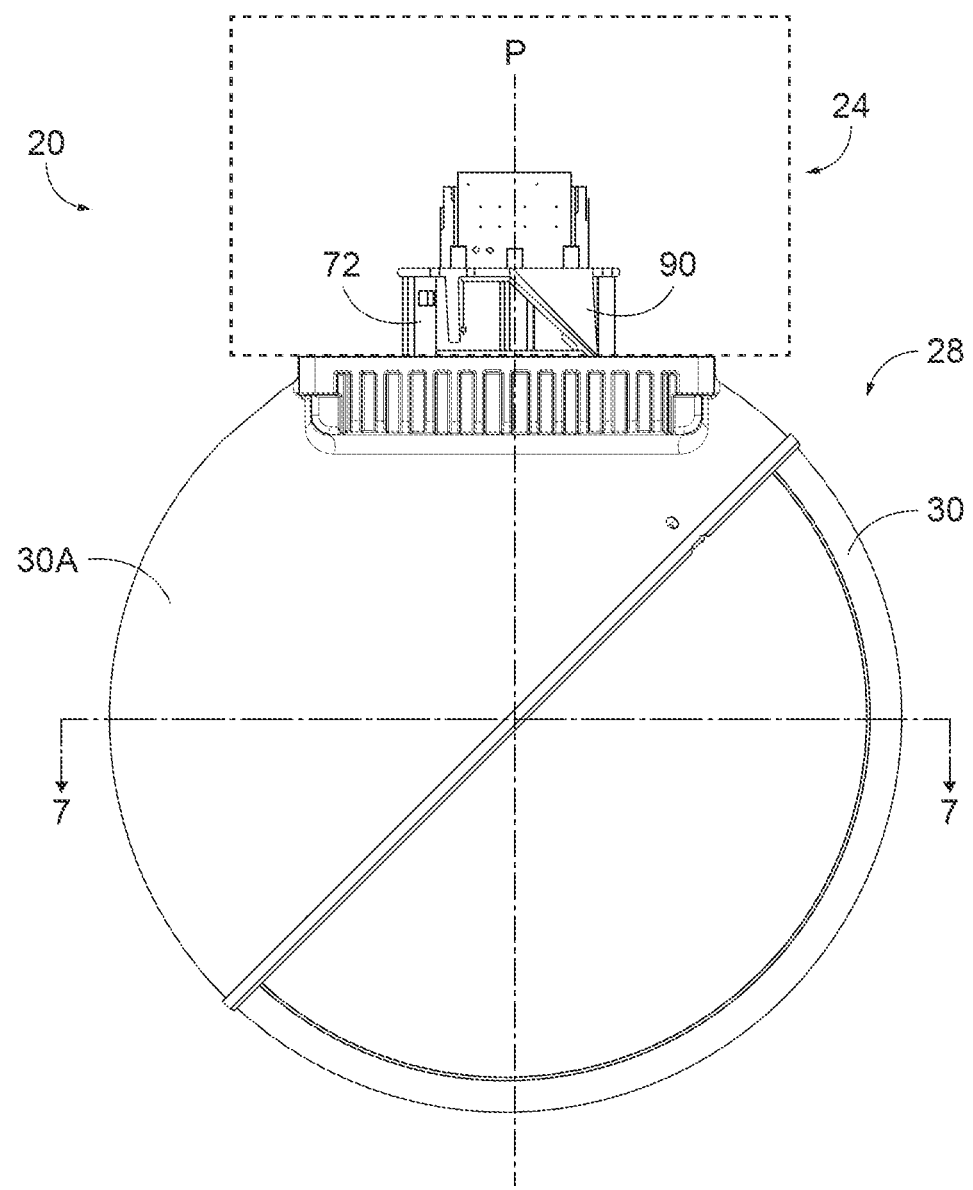
FIG. 1 is a side elevation view of a surveillance camera assembly according to one embodiment of the present invention, the camera assembly including a ball-shaped head including a hemispherical dome.
Figure 6:
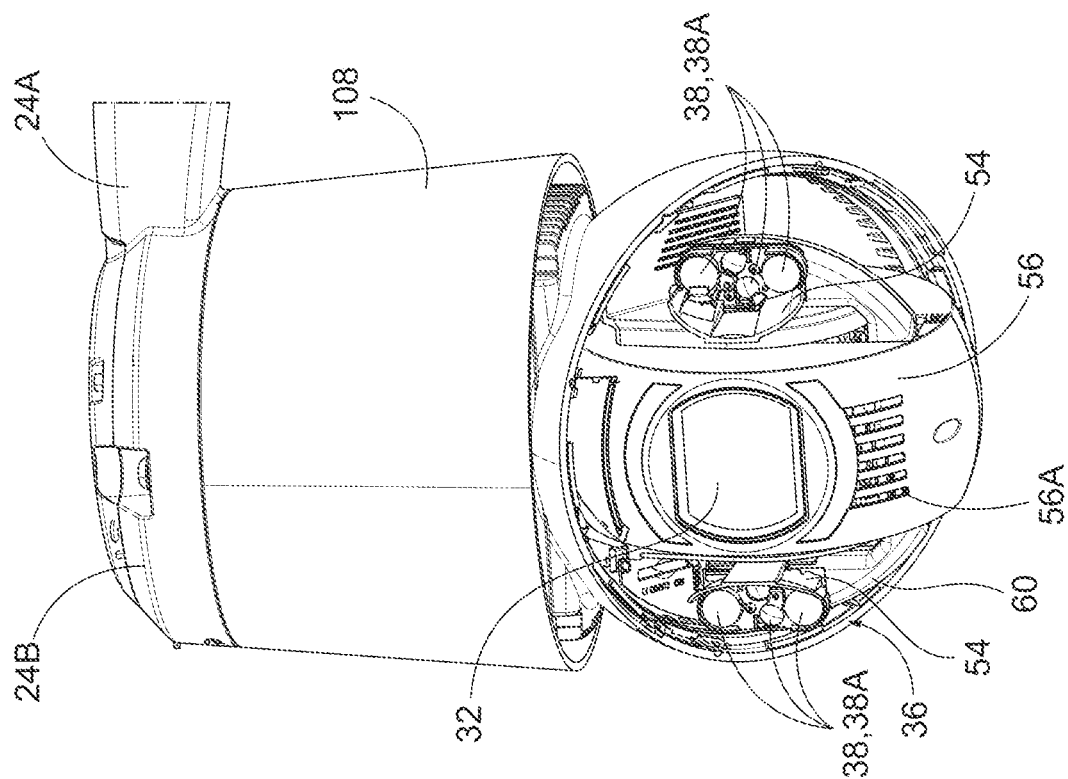
FIG. 6 is a perspective view of the camera assembly similar to FIG. 5, but with the dome removed to better illustrate the internal construction.
Figure 5:
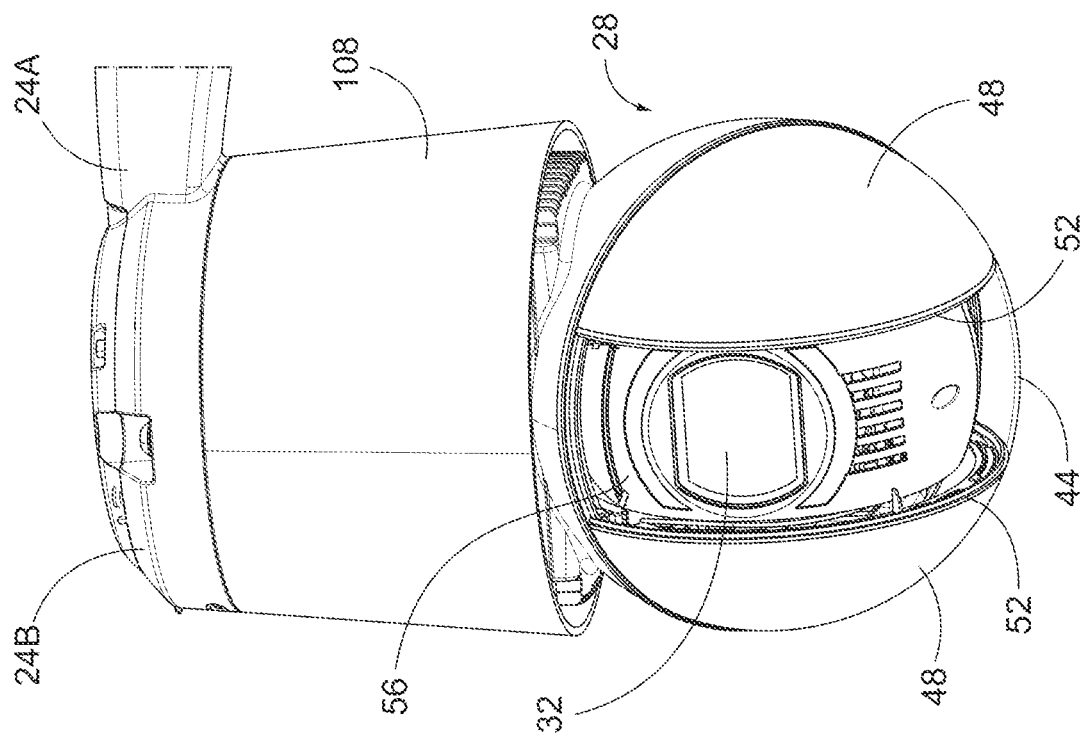
FIG. 5 is a perspective view of the camera assembly of FIGS. 1-2.

A surveillance camera assembly 20, as shown in FIG. 1, includes an upper portion 24 and a ball-shaped head portion 28 depending from the upper portion 24. The upper portion 24 can include, in addition to a housing 108 (e.g., cylindrical or frustoconical), one or more mounting features such as an arm 24A and/or a fastening flange 24B (FIGS. 5-6) adapted for securement to a pole or other fixed structure, e.g., building wall, exterior roof, or interior ceiling. The head portion 28, which is at least partially defined by a translucent dome 30, also referred to as a window or a bubble, houses a camera lens module 32 operable to pass imagery of the surrounding area to an image sensor S for the creation and collection of still and/or motion surveillance footage. The head portion 28 as shown in FIG. 1 can also include an opaque housing or backing portion 30A joined with the dome 30. In addition to the camera lens module 32, the head portion 28 houses an illuminator module 36 including two separate arrays of lighting elements 38, each array consisting of one or more lighting elements 38 (e.g., LED light sources). As discussed in further detail below, the lighting elements 38 can be of a single type or two or more different types (i.e., different lighting output). Illuminator circuit boards 40, for example one for each array, may be provided for mounting the lighting elements 38.

The camera lens module 32 and the illuminator module 36 are coupled together to pan (about a pan axis P) and tilt (about a tilt axis T) together to ensure that the illuminator beams coincide with the camera lens field of view. For example, the camera lens module 32 and the illuminator module 36 can be mounted to a movable bracket or bracket assembly, referred to herein as the tilt carriage 42 (FIG. 9), that is manipulated by pan and tilt drives (e.g., including respective electric motors) located within the upper portion 24 or head portion 28. The central part of the tilt carriage 42 supports the camera lens module 32, while opposed extension flanges or wings 42A support the respective illuminator circuit boards 40 with the banks of lighting elements 38. Pan and tilt operations physically move the camera lens module 32 and the illuminator module 36 with respect to the upper portion 24. However, the dome 30 may move with the camera lens module 32 and the illuminator module 36 about the pan axis P. There may be provided multiple banks of lighting elements 38 with different beam angles which are energized in combinations to coincide with the lens zoom setting to illuminate the scene efficiently. The illuminator module's high-powered LED light sources 38 may emit a spectrum that is relatively narrow—e.g., 850 nm or 940 nm—in the infrared (IR) range. In one construction, the illuminator module 36 uses total internal reflection (TIR) lenses 38A to produce a narrow beam using four 850 nm LEDs, a medium beam using two 850 nm LEDs, and a wide beam using two 940 nm LEDs. IR illumination utilizes light radiation beyond the visible range normally observable by humans. Since the camera image sensor is sensitive to IR light, the illumination is effective for enhancing the camera image, but largely invisible to people under observation.

The camera lens module 32 tilts behind a window 44 provided as a segment of the dome 30 that follows a longitudinal path down a center strip of the dome 30. The window 44 follows a straight path along the hemispherical-shaped dome 30. The camera lens module 32 tilts within the path or swath defined by the window 44. The two separate banks of light sources 38 of the illuminator module 36 are located in the segments of the ball-shaped head 28 on either side of the center section where the camera lens module 32 is located. The illuminator beams (e.g., IR light) shine through their own windows 48, which are complementary hemispherical segments on either side of the central camera lens window 44. The respective windows 44, 48 have polished exterior surfaces that easily pick up reflections from their surroundings and/or are tinted, so it is difficult to discern changes in the tilt angle during operation of the camera assembly 20. Due to the above noted features, the camera lens 32 and illuminator module 36 move covertly. Both the camera lens window 44 and the illuminator windows 48 form parts of the round ball-shaped head 28 with an axis of rotational symmetry that coincides with the camera pan axis P, so pan rotation is less noticeable. The camera lens window 44 can be clear or at least clearer than the illuminator windows 48. For example, the camera lens window 44 can be optically transparent so as to allow the camera lens module 32 to collect accurate footage during use. To obscure the internals of the head portion 28, the illuminator windows 48 can be darkened by a material additive or coating so as to not be transparent, while still remaining translucent to allow the passage of light (e.g., IR) from the lighting elements 38.

Figure 3:
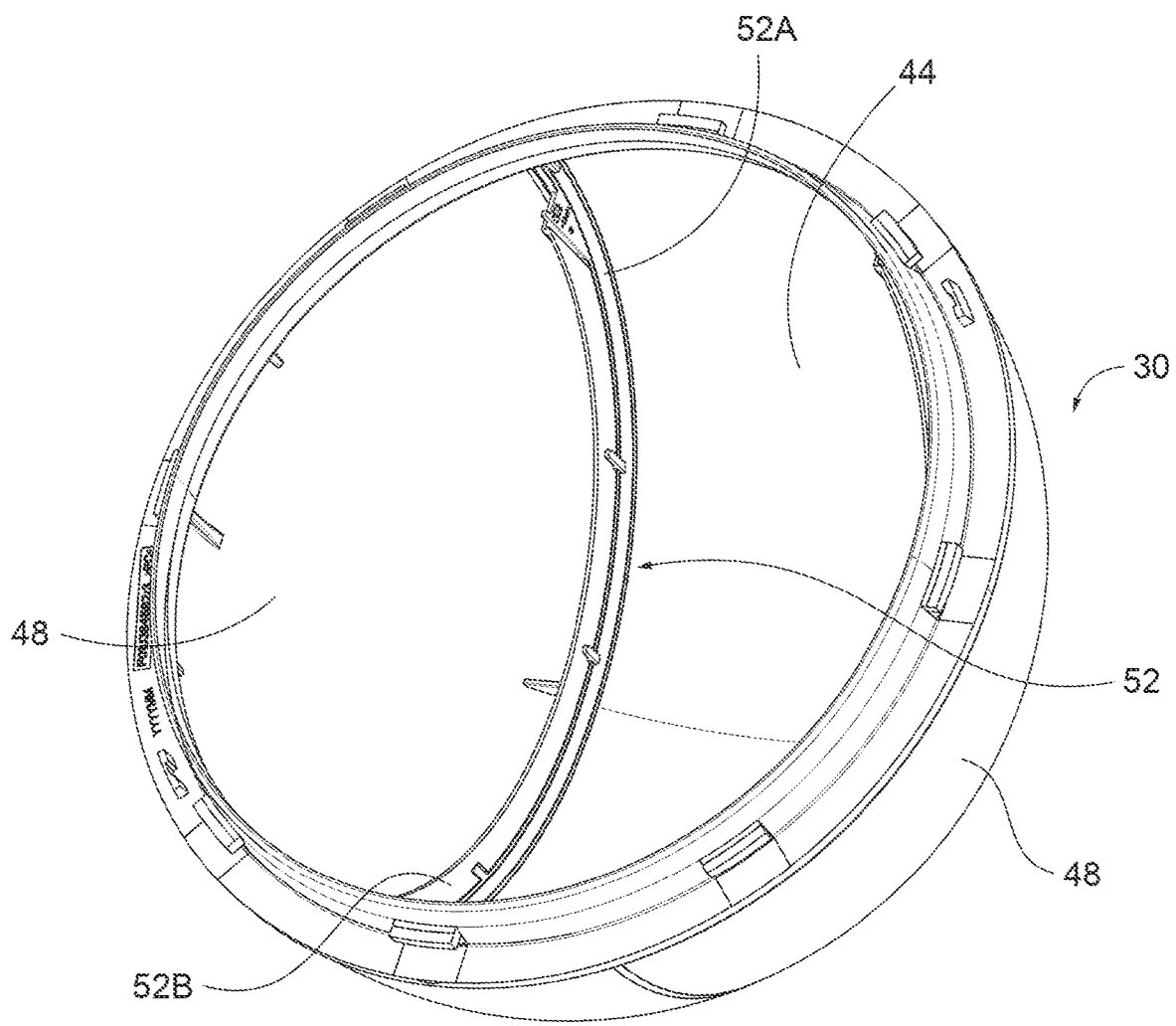
FIG. 3 is a perspective view of an interior side of a dome of the camera assembly of FIGS. 1-2.
Figure 4:
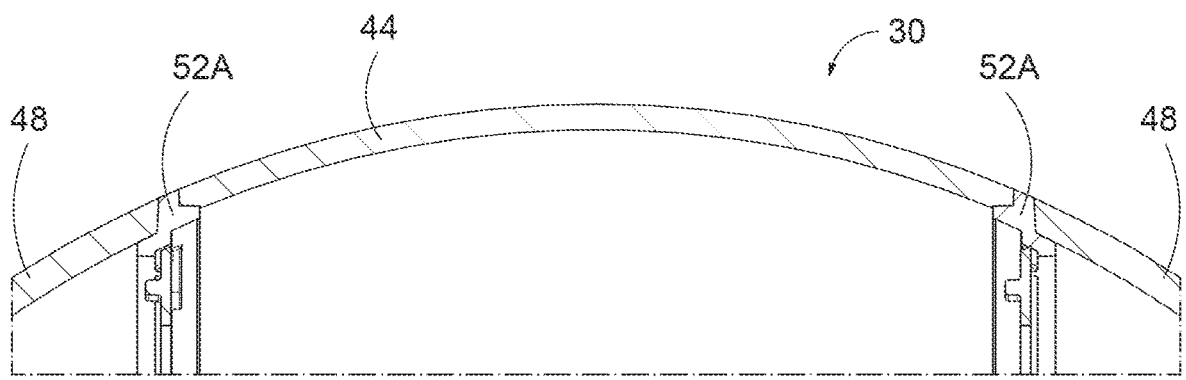
FIG. 4 is a cross-section view of the dome of FIG. 3.

Because stray radiation emitted from the illuminator module 36 could adversely affect the camera image if it leaked into the camera lens 32, light barriers 52 are placed on either side of the camera lens window 44, and further light barriers 54 are incorporated into each bank of the illuminator module 36. Each of the light barriers 52 of the dome 30 can be made up of multiple pieces rather than a single piece. For example, FIGS. 3 and 4 illustrate an exemplary manner of providing each light barrier 52 with a first component 52A that is integrated into the dome structure between the camera window 44 and one of the side illuminator windows 48. In practice, the first light barrier component 52A can be an opaque material provided as an insert into a mold cavity following molding of the camera window 44 during a first molding shot (e.g., injection molding with the transparent material for the camera window 44. The material for the translucent illuminator windows 48 can then be introduced to the mold in a second molding shot so that the opaque components 52A become integrated or captured in place on the dome 30. Each of these first components 52A can include a structure for mechanically engaging a second light barrier component 52B that extends further into the interior of the dome 30. The second light barrier components 52B can engage the first components 52A by a snap fit.

Figure 8:
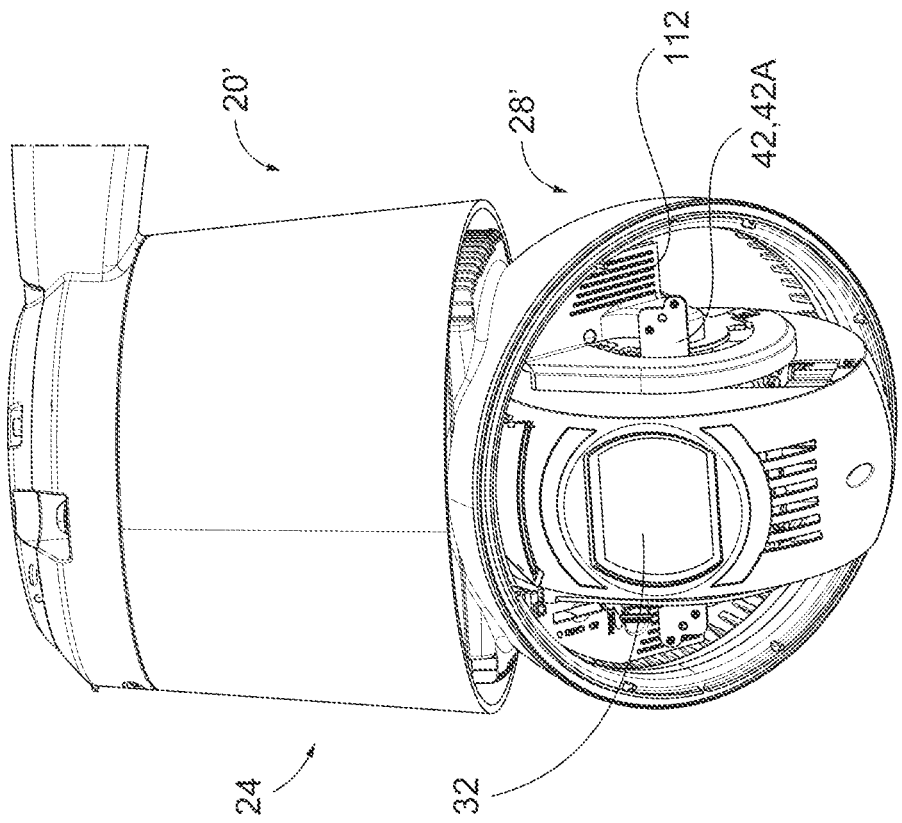
FIG. 8 is a perspective view of the camera assembly similar to FIG. 7, but with the dome removed to better illustrate the internal construction.
Figure 7:
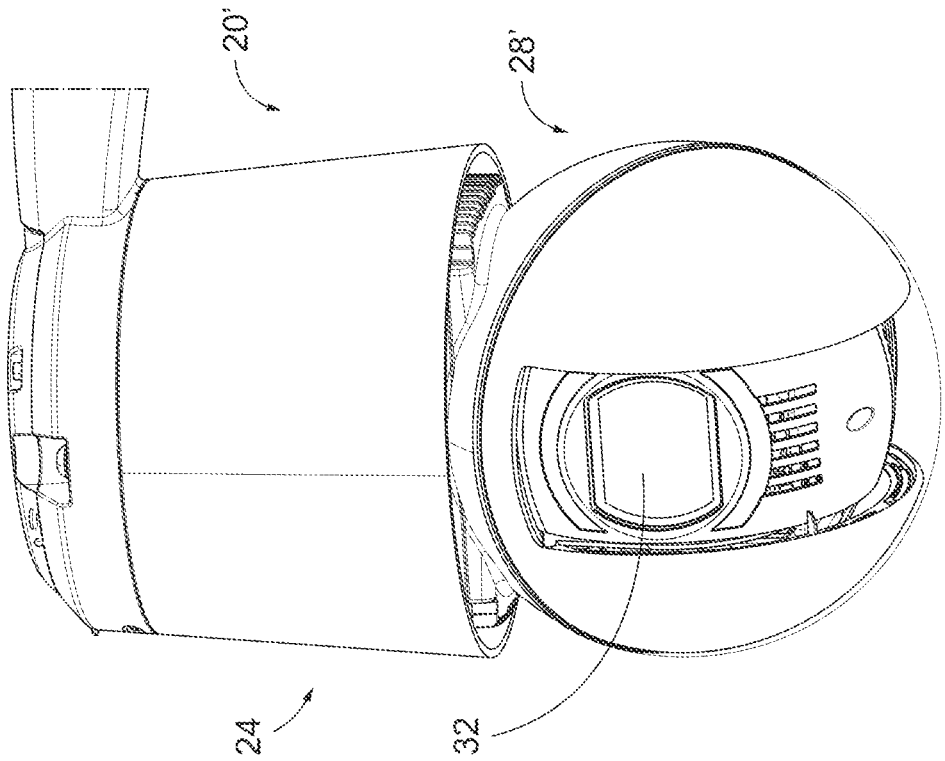
FIG. 7 is a perspective view of an alternate camera assembly, similar to FIGS. 1-6, but without an illuminator module.

The light barriers 52 on the dome 30 cooperate with a lens housing 56 (or "camera blind") to divide the interior of the head portion 28 into three distinct zones A, B, C. The zones A, B, C may be sealed off from each other, or rather, partially closed or restricted. As will become apparent from the following description, these zones A, B, C are not only useful in preventing internal reflection to the camera lens module 32, but also for heat management in the definition of a closed-loop cooling circuit. The cooling circuit enables the diffusion of heat from point heat sources, without expelling heated air out of the camera assembly 20 as the interior of the camera assembly 20 is sealed from the surrounding environment. As can be best appreciated from FIGS. 6 and 11-14, the lens housing 56 can be formed in two parts, generally front and rear that join together, e.g., by latching or snapping together. The front portion of the lens housing 56 includes a lens opening. At a position below the lens opening, the front part of the lens housing 56 is perforated, including one or more openings 56A in the shape of holes, slits, etc. The openings 56A connect two subdivided zones of the first zone A, one outside the lens housing 56 and one inside the lens housing 56. Within the backing portion 30A of the head 28, away from the dome 30, the lateral second and third zones B, C are in open fluid communication with each other. In a version of the camera assembly 20' not having the illuminator module 36 (see FIGS. 7 and 8), the same dome 30 can be used, without the addition of the second light barrier components 52B. Aside from the absence of a cooling duct 62 (described in detail below), the camera assembly 20' can circulate air and dissipate heat via a closed-loop airflow circuit in much the same way as is described in the following description in regard to the camera assembly 20. In other words, heat can be transferred out of the head portion 28 to other portions of the camera assembly 20', although there may be a lower overall heating load due to the absence of the illuminator module 36.

Figure 15:
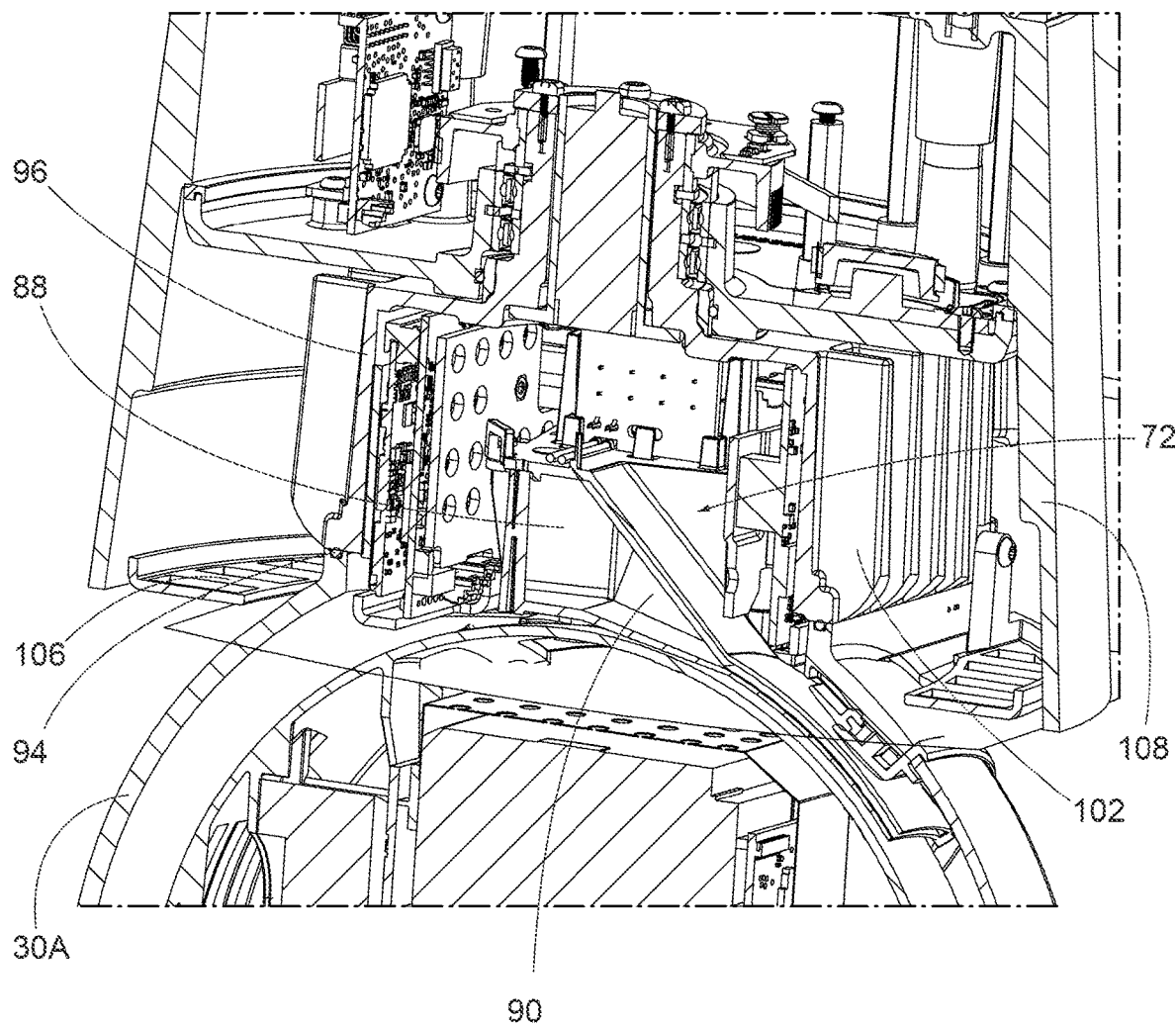
FIG. 15 is a cross-section of an upper dome portion and a concealed pan stage module coupled therewith.
Figure 16:
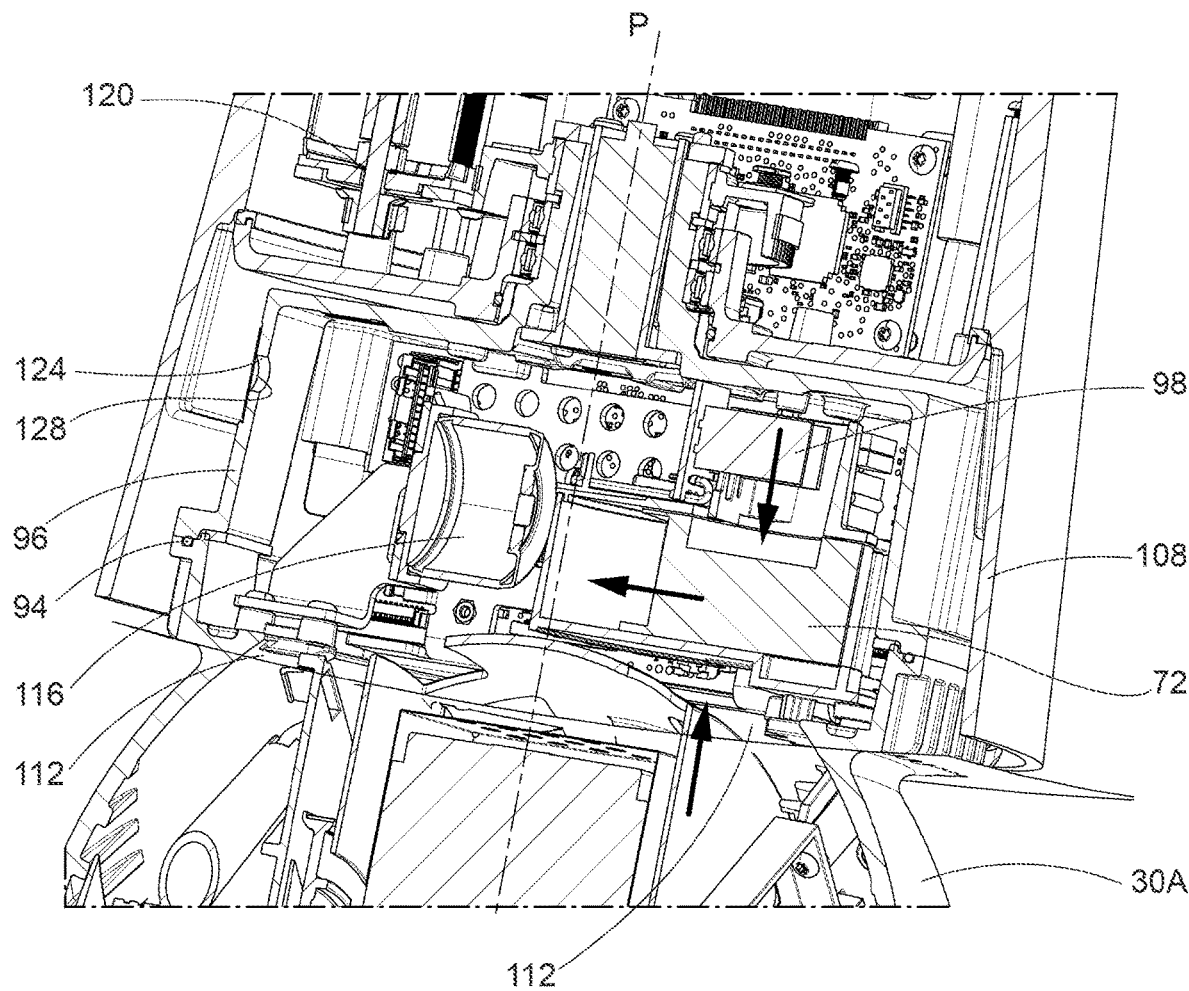
FIG. 16 is a second cross-section of the upper dome portion and the concealed pan stage module.

Returning to the camera assembly 20 of the initial embodiment, it can be seen in the cross-section views of FIGS. 15 and 16 that the upper portion of the backing portion 30A forms a sealed interface 94 with a pan stage housing 96 situated within the upper portion 24. More particularly, the pan stage housing 96 encloses a blower 72 (an "upper" blower, or "pan stage" blower), the operation of which is described further below, along with a heating element 98 that is operable during operation in cold ambient conditions. As shown in FIG. 16, the heating element 98 is positioned directly above an inlet of the blower 72, although other arrangements are optional. The blower 72 and the heating element 98 provide a pan stage thermal module designed to help manage operational temperature of the camera assembly 20. The pan stage housing 96 can be constructed of metal. As shown in FIG. 15, the outside of the pan stage housing 96 can include a plurality of heat dissipating fins 102. The fins 102 are in communication with ambient air through a vent structure 106 that enables air passage into/out of the outer housing 108 (or "sun shade") of the upper portion 24, inside which the pan stage housing 96 is located. Although constructed of a plastic material with a lower heat conduction coefficient than the pan stage housing 96, the upper portion of the backing portion 30A can also be finned on its exterior as shown in FIG. 16. As discussed further below, air may be circulated between an interior of the dome 30 and an interior of the pan stage housing 96 via one or more passages 112 (FIG. 16). Another example of such passages 112 is clearly illustrated in the camera assembly 20' of FIG. 8.

In addition to the elements of the pan stage thermal module, the pan stage housing 96 encloses a tilt motor 116 coupled (e.g., via belt drive) to the camera lens module 32 to selectively change the tilt angle relative to horizontal. The entire pan stage housing 96, along with its contents, are configured for rotation about the pan axis P by a pan motor 120. The pan motor 120 is located within the outer housing 108, above the pan stage housing 96 as shown in FIG. 16. A slip ring is provided at the pan axis P. Although the interior of the pan stage housing 96 is generally sealed from the ambient environment so as to not freely exchange air therebetween, FIG. 16 illustrates that the pan stage housing 96 can have a controlled breather port 124 formed therein. The breather port 124 can be covered by a sheet of hydrophobic material 128 that prevents water intrusion and free-flowing airflow while offering long-term pressure and/or humidity balancing.

Figure 2:
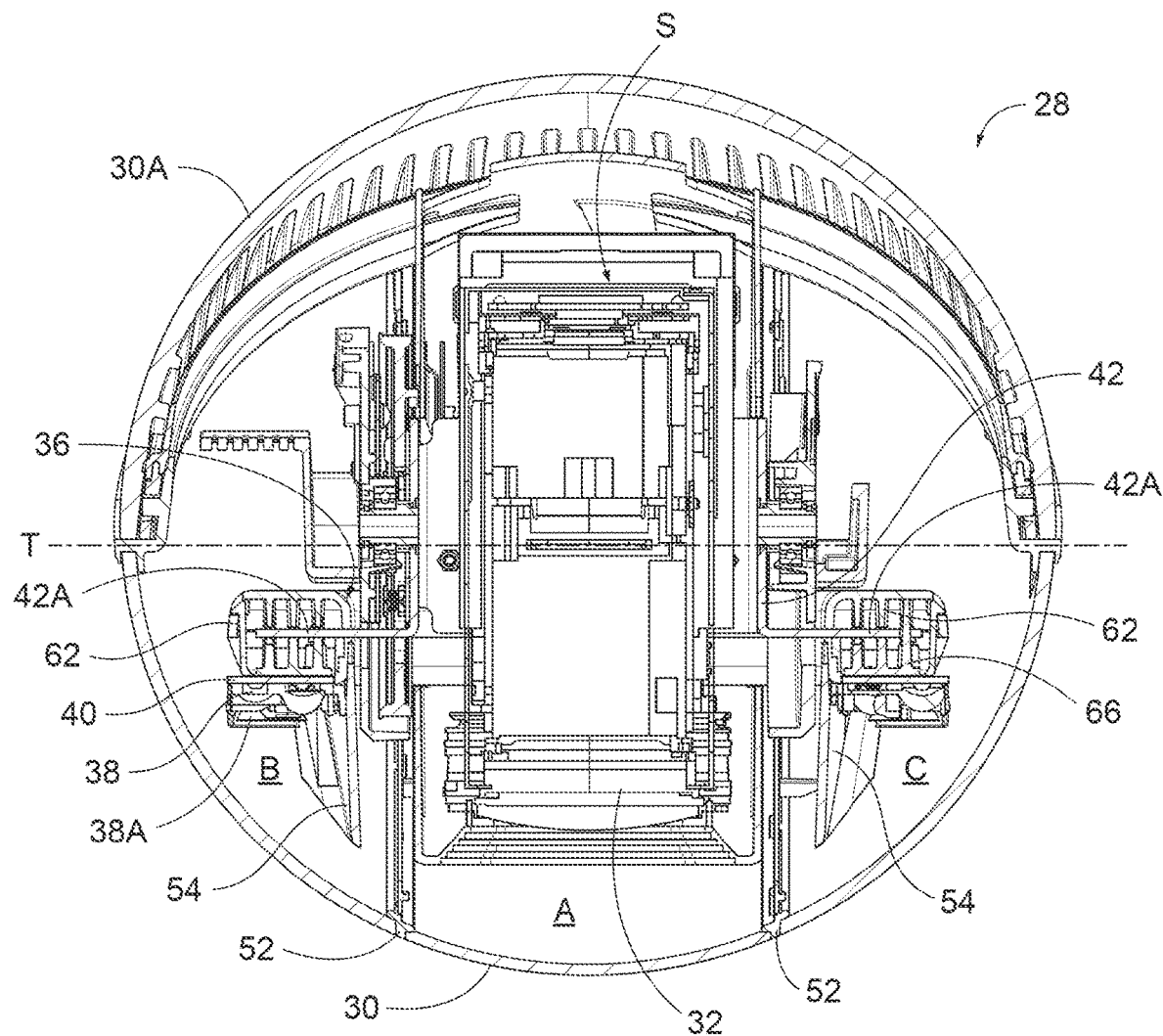
FIG. 2 is a cross-section taken along line 2-2 of the camera assembly of FIG. 1 to illustrate a camera lens module and an illuminator module that moves with the camera lens module inside the dome.
Figure 9:
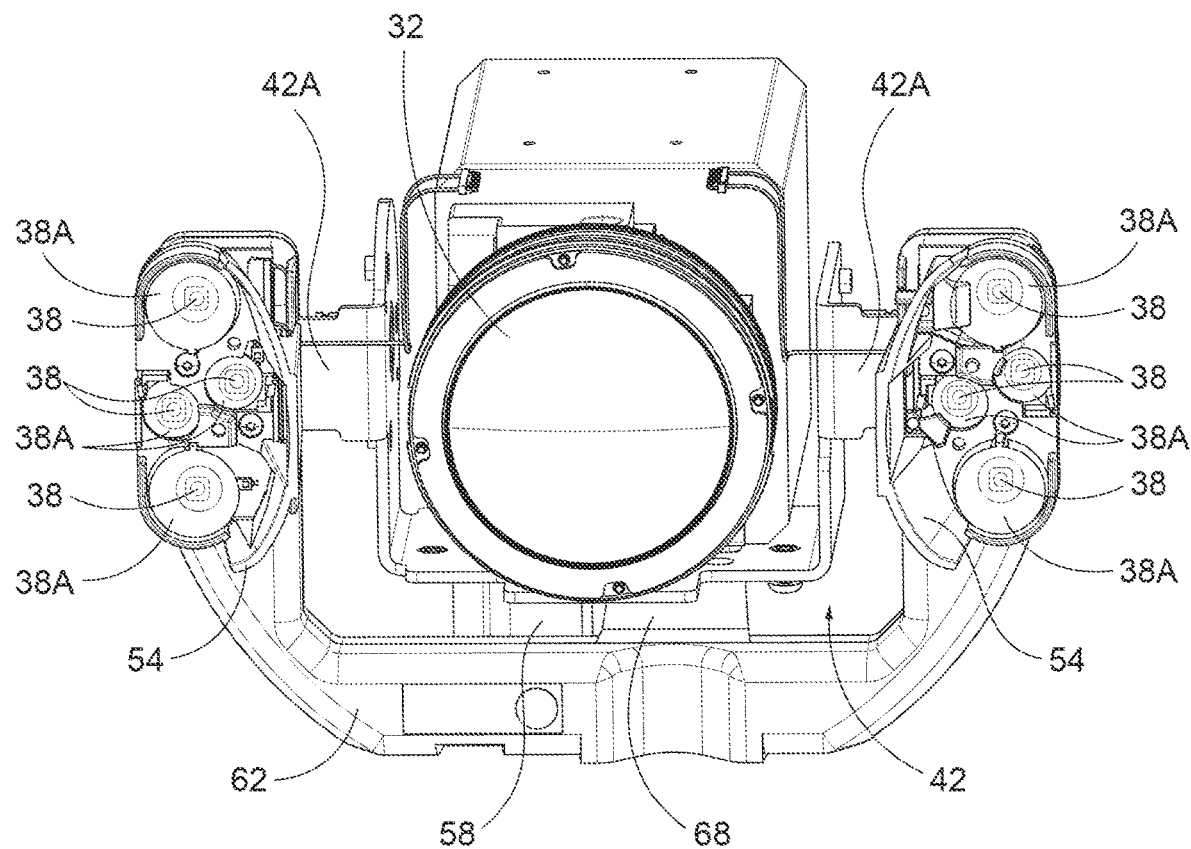
FIG. 9 is a perspective view of the camera lens module and the illuminator module of the camera assembly of FIGS. 1-6, shown jointly mounted to a carriage.
Figure 10:
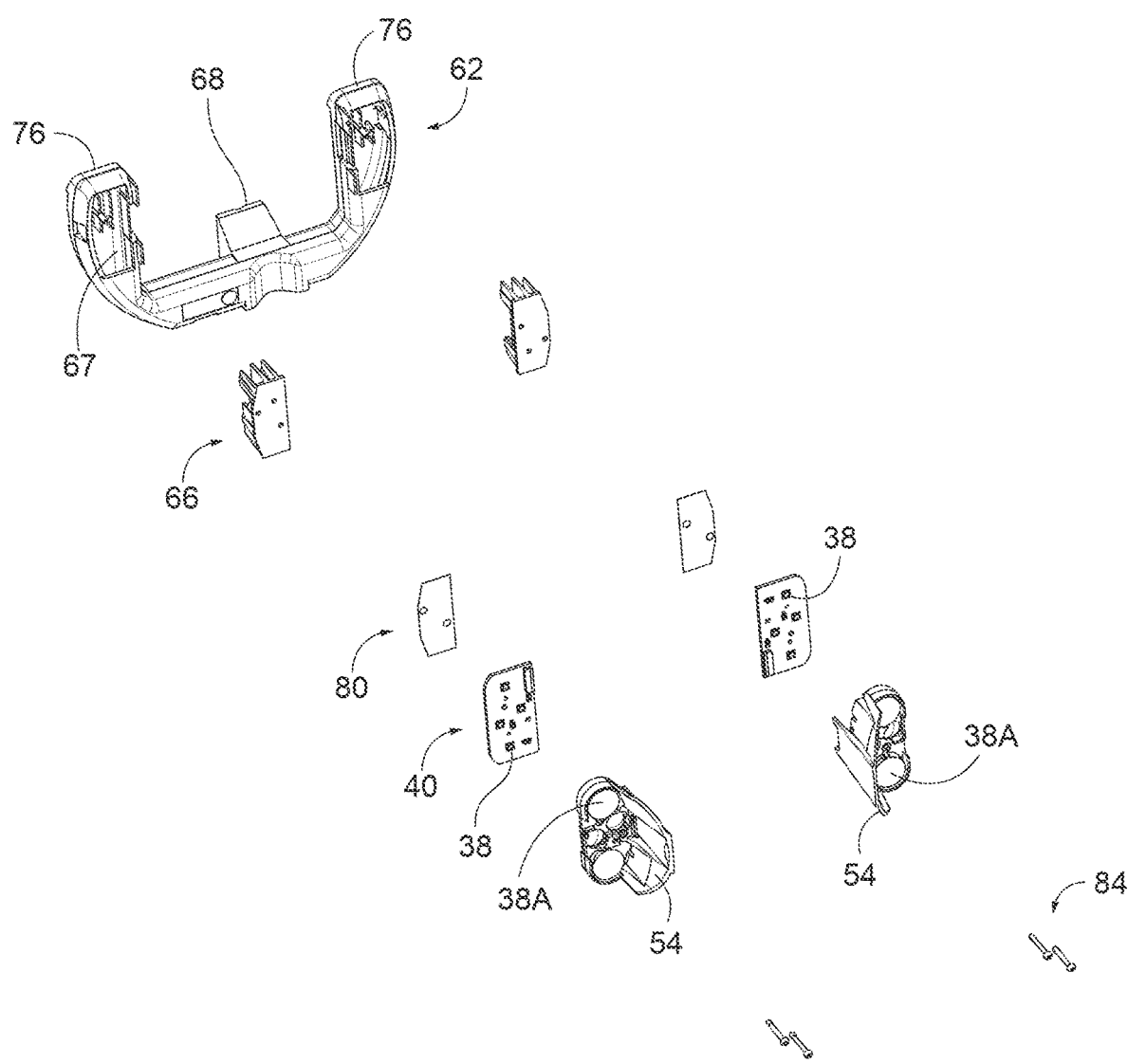
FIG. 10 is an exploded assembly view of the illuminator module shown in FIG. 9.
Figure 11:
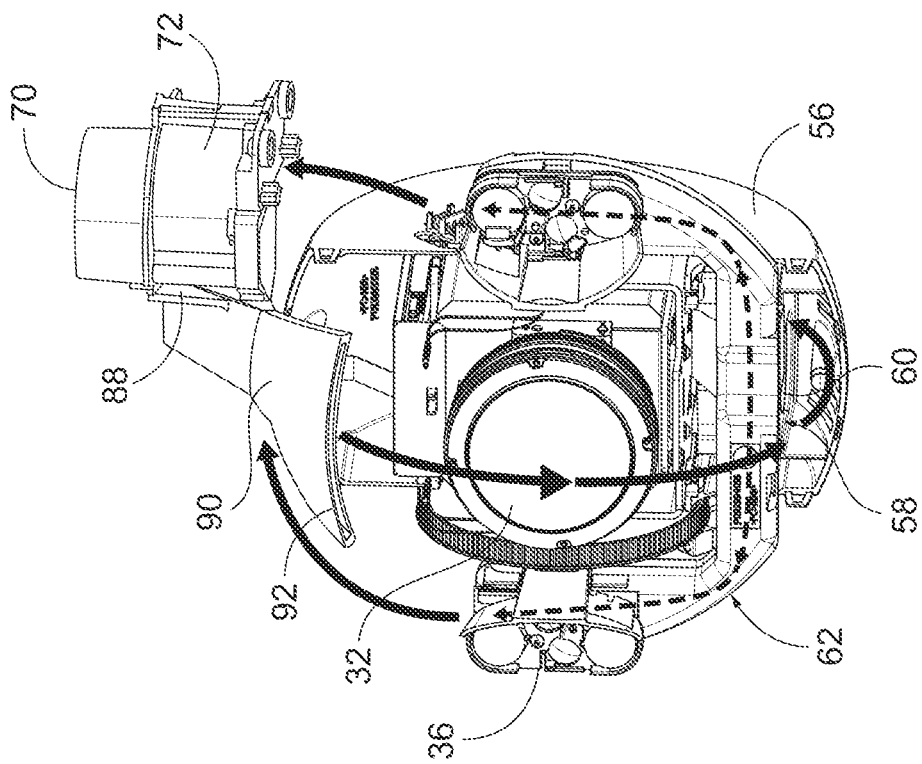
FIG. 11 is a perspective view of the camera lens module and the illuminator module of the camera assembly of FIGS. 1-6, shown here with a full lens housing as well as an upper blower and air distribution duct. The camera lens module and illuminator module are shown in a straight-ahead or horizontal tilt position.

As shown in FIG. 10, the illuminator module 36 can include a cooling duct 62 that at least partially receives respective heat sinks 66 for forced convection cooling. For example, the cooling duct 62 can be formed with respective cavities or pockets 67 that at least partially receive the heat sinks 66. The duct 62 has a central inlet 68 and two distal outlets 76. The heat sinks 66 are coupled to the back sides of the respective LED circuit boards 40, with gap pads 80 therebetween. The gap pads 80 and the circuit boards 40 can be sandwiched between the heat sinks 66 on one side (rear) and the lenses 38A and the light barriers 54 on the other side (front). This sandwich structure can be retained or assembled by one or more fasteners, e.g., screws 84, pins, adhesive, etc. In the illustrated construction, the screws 84 are threaded into apertures in the wings 42A of the tilt carriage 42. In addition to the lighting elements 38 moving with the camera lens module 32 for pan and tilt, the duct 62 also so moves, such that the fins on the heat sinks 66 remain exposed to the interior airflow of the duct 62. In some constructions, the duct 62 is formed in two parts, for example front and rear parts that snap together to define the interior airflow cavity and at the same time sandwich the wings 42A of the tilt carriage 42 for attachment therewith (FIGS. 2 and 9).

The lighting elements 38 are cooled by air from a blower 58 (a "lower" blower or "illuminator" blower) that resides in the ball-shaped head portion 28 underneath the camera lens 32. In this location, the illuminator blower inlet 60 draws air that has passed through zone A over the inside of the camera window 44 and over the front of the camera lens module 32. The inlet 60 can be positioned at a portion of the lens housing 56 approximately 90 degrees below the front face of the camera lens module 32. The lens housing 56 can form an inlet manifold for the blower inlet 60 that is open to the front side and not to the rear side. Output air from the illuminator blower 58 flows into and through the bifurcated cooling duct 62 that splits the flow to direct cooling air to both illuminator banks on either side of the camera lens module 32. These two air streams pass over the heat sinks 66 that are in contact with the illuminator light sources 38 and have fins inside the respective portions of the duct 62 (e.g., a plurality of fins having different heights as shown in FIG. 2). Air from the blower 58 is discharged in a forward direction into the inlet 68 of the duct 62, the inlet 64 being centrally located in the duct 62, between the bifurcated portions that extend to the respective illuminator banks. After the cooling air passes over these heat sinks 66 to collect heat generated from the light sources 38, the heated air is then released rearward through the distal outlets 76 from the duct 62 into the respective lateral zones B, C that form the upper outer sections of the ball-shaped head 28. From the lateral zones B, C, which are in common fluid communication, the air is drawn into an inlet 70 of the blower 72 forming part of the pan stage thermal module located at least partly in the upper portion 24, e.g., the pan stage housing 96 above the ball-shaped head 28. Air taken in by the upper blower 72 is discharged from an outlet 88 thereof into a discharge manifold or nozzle 90 having a cross-section that tapers into a long, thin (and arcuate) slit discharge opening 92 situated above the front of the camera lens module 32 and directed to discharge the air generally tangential to the lens housing 56, the front surface of the camera lens module 32, and the interior surface of the dome's camera window 44. Upon traveling vertically across the front of the camera lens module 32, the air passes from the exterior of the lens housing 56 to an interior thereof by way of the openings 56A to return to the inlet 60 of the lower blower 58.

Figure 12:
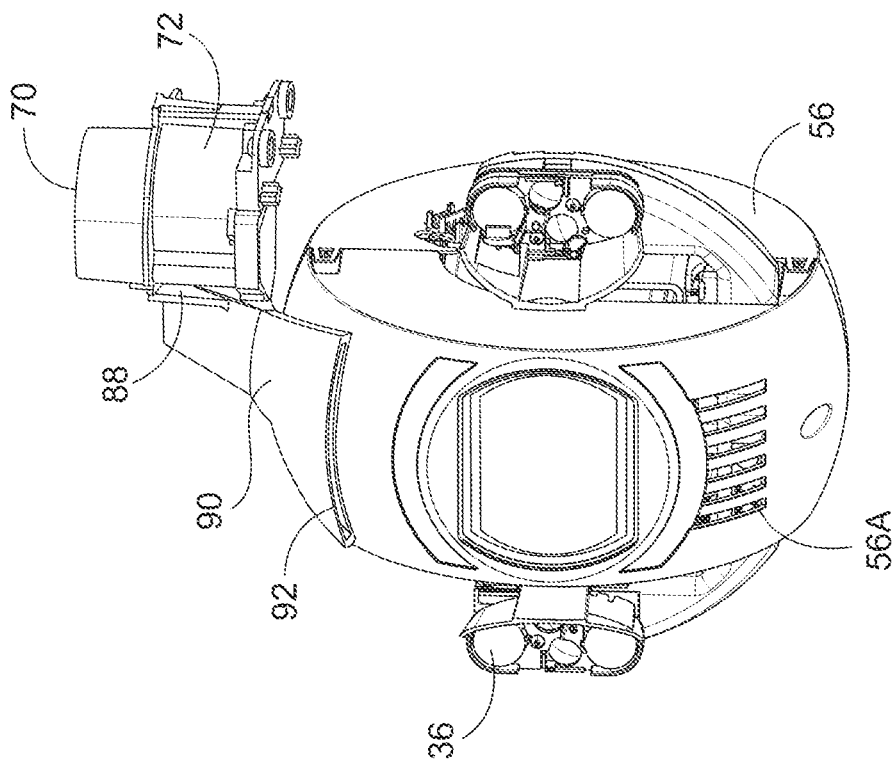
FIG. 12 is a perspective view similar to FIG. 11, with a front portion of the lens housing removed, and the addition of a set of arrows schematically illustrating the forced airflow pattern within the camera assembly.
Figure 14:
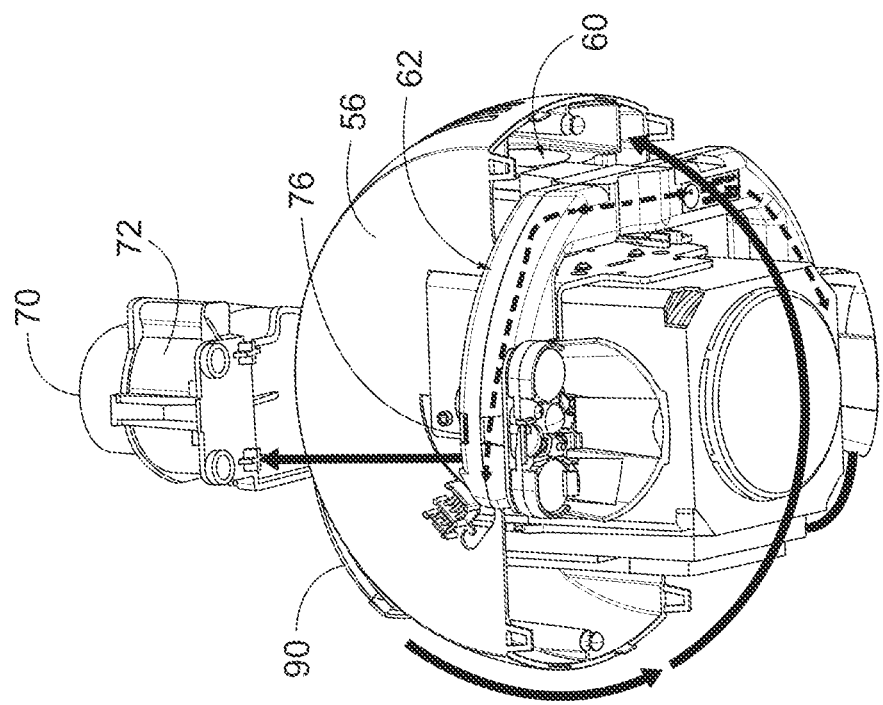
FIG. 14 is a perspective view similar to FIG. 12 with schematic airflow illustration, although the camera lens module and the illuminator module are shown in the downward tilt position of FIG. 13.
Figure 13:
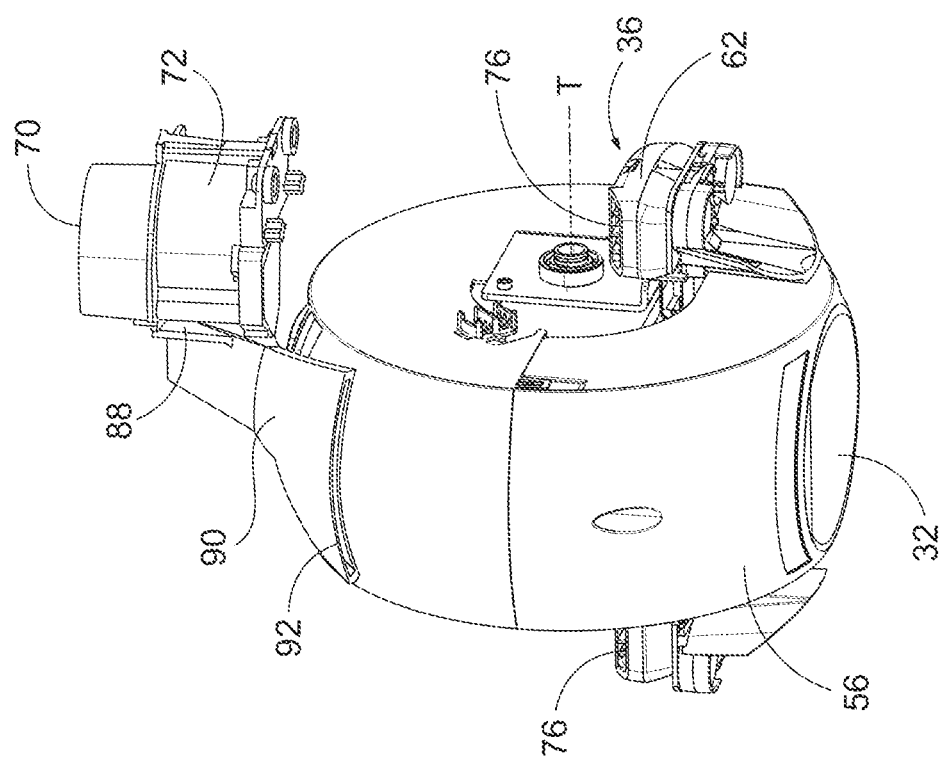
FIG. 13 is a perspective view similar to FIG. 11, with the camera lens module and the illuminator module shown in a downward tilt position.

The closed-loop airflow circuit, including the forced air driven through the duct 62 by the illuminator blower 58, works in concert with the pan stage thermal management module to take the hottest air (from the area of the illuminator heat sinks 66) out of the head portion 28 as shown in FIGS. 12 and 14 so that the heat collected by the airflow is diffused and absorbed into other areas of the camera assembly 20. The air heated by the illuminator heat sinks 66 is drawn in from the two lateral zones B, C to the pan stage blower 72, rather than leaving it to stagnate in the highly insulative enclosure of the head portion 28. In this way, convective heat transfer is accomplished over a larger surface area of the enclosure, which lowers the steady-state internal temperatures and thus enables extended allowable running conditions with respect to ambient temperatures. As noted above, the pan stage housing 96 can be constructed of metal and enhanced with high exterior surface area by way of the fins 102 to maximize the benefits associated with circulating the airflow from the dome 30 into the upper portion 24. As the head portion 28 is predominantly or completely enclosed by plastic to serve other objectives, the higher conductivity of the metal pan stage housing 96 greatly enhances the thermal performance. For example, the camera assembly 20 may be safely operated at ambient temperatures 5-10 degrees Fahrenheit warmer than a similar camera assembly with dome-contained lighting elements and cooling airflow limited to the dome itself. By drawing in the output of the pan blower air stream across the inside of the clear camera viewing window 44, the illuminator module 36 is helping ensure the window will stay warm and free of frozen external precipitation or internal condensation. Thus, in some constructions, the pan stage heating element 98 can be downsized or eliminated. By re-directing the illuminator cooling flow outboard into the IR segments, the illuminator module 36 prevents undesirable heating of the camera lens module 32.

Although the invention has been described in detail with reference to certain preferred embodiments, variations and modifications exist within the scope and spirit of one or more independent aspects of the invention as described.

What is claimed is:

1. A surveillance camera assembly comprising:
   an upper portion providing a mounting feature for the surveillance camera assembly;
   a ball-shaped head portion coupled to the upper portion;
   a camera lens module positioned within the head portion and movable relative to the upper portion to pan about a pan axis and tilt about a tilt axis; and
   an illuminator module movable to pan and tilt with the camera lens module, wherein the illuminator module includes laterally opposed arrays of lighting elements supported on distal ends of a bifurcated cooling duct having a central inlet opening coupled to the discharge outlet of a first blower.

2. The surveillance camera assembly of claim 1, wherein the ball-shaped head portion is at least partially defined by a hemispherical dome having a central camera window arranged along a tilt path of the camera lens module, the dome further having first and second illuminator windows arranged to the respective lateral sides of the central camera window.

3. The surveillance camera assembly of claim 2, wherein the dome is configured to move with the camera lens module for pan movements.

4. The surveillance camera assembly of claim 1, wherein the cooling duct forms part of a closed-loop airflow circuit along which are provided the first blower and a second blower, wherein the second blower is situated at least partially within a metallic housing of the upper portion.

5. The surveillance camera assembly of claim 1, wherein the cooling duct is bifurcated to wrap around the camera lens module, and wherein the distal ends of the cooling duct include respective outlets located in respective lateral zones of the head portion defined on respective lateral sides of the camera lens module.

6. The surveillance camera assembly of claim 5, wherein the laterally opposed arrays of lighting elements include first and second arrays of lighting elements arranged on front sides of respective first and second circuit boards, and wherein first and second heat sinks are provided on rear sides of the respective first and second circuit boards.

7. The surveillance camera assembly of claim 6, wherein each of the first and second heat sinks is positioned at least partly within the cooling duct.

8. The surveillance camera assembly of claim 5, further comprising a second blower positioned at least partly in the upper portion, the second blower having an inlet configured to pick up air from the respective lateral zones, wherein the second blower has an outlet coupled with a discharge duct having a slit-shaped outlet positioned to direct air from the second blower in front of the camera lens module.

9. A surveillance camera assembly comprising:
   an upper portion providing a mounting feature for the surveillance camera assembly;
   a ball-shaped head portion coupled to the upper portion;
   a camera lens module positioned within the head portion and movable relative to the upper portion to pan about a pan axis and tilt about a tilt axis;
   an illuminator module movable to pan and tilt with the camera lens module, wherein the illuminator module includes laterally opposed first and second arrays of lighting elements arranged on front sides of respective first and second circuit boards, and wherein first and second heat sinks are provided on rear sides of the respective first and second circuit boards; and
   a closed-loop airflow circuit including a first blower configured to pick up air from a central zone of the head portion in front of the camera lens module and direct air through enclosed passages over the first and second heat sinks,
   wherein respective outlets of the enclosed passages are located in respective first and second lateral zones of the head portion to the sides of the camera lens module, and
   wherein both the first and second lateral zones are in fluid communication with an inlet of a second blower positioned at least partly in the upper portion.

10. The surveillance camera assembly of claim 9, wherein the ball-shaped head portion is at least partially defined by a hemispherical dome having a central camera window arranged along a tilt path of the camera lens module, the dome further having first and second illuminator windows arranged to the respective lateral sides of the central camera window.

11. The surveillance camera assembly of claim 10, wherein the dome is configured to move with the camera lens module for pan movements.

12. The surveillance camera assembly of claim 9, wherein the second blower is situated at least partially within a metallic housing of the upper portion.

13. The surveillance camera assembly of claim 9, wherein the second blower has an outlet coupled with a discharge duct having a slit-shaped outlet positioned to direct air from the second blower in front of the camera lens module.

14. The surveillance camera assembly of claim 9, wherein the head portion is suspended directly below the upper portion.

15. The surveillance camera assembly of claim 9, wherein the laterally opposed arrays of lighting elements are supported on distal ends of the cooling duct having a central inlet opening coupled to the discharge outlet of the first blower.

16. A method of operating a surveillance camera assembly for thermal management, the method comprising:
   providing an upper portion for mounting and a separate head portion including a dome containing a camera lens module and an illuminator module including respective arrays of lighting elements provided alongside the camera lens module;
   sealing the interior of the surveillance camera assembly from the ambient environment; and
   providing a closed-loop airflow circuit to take air from a central zone in front of the camera lens module into a first blower to be subsequently directed through enclosed passages for directed cooling of the respective arrays of lighting elements, and subsequently directing the airflow heated by the respective arrays of lighting elements into an inlet of a second blower located at least partly in the upper portion, the second blower discharging air back to the central zone in front of the camera lens module,
   wherein heat from the respective arrays of lighting elements is transferred by the closed-loop airflow circuit to a metal housing of the upper portion.

17. The method of claim 16, further comprising providing respective heat sinks on rear sides of the respective arrays of lighting elements, and blowing air through the enclosed passages and over the respective heat sinks.

18. The method of claim 16, further comprising blowing air from the second blower through a discharge duct to a slit-shaped outlet that directs the air in front of the camera lens module in the central zone.

19. The method of claim 16, wherein the enclosed passages are formed by a bifurcated ducts, the method further comprising directing air from an outlet of the first blower into a central inlet opening of the bifurcated duct.

20. The method of claim 16, further comprising expelling air heated by the respective arrays of lighting elements from respective outlets of the enclosed passages located in respective lateral zones alongside the central zone.

* * * * *